(12) United States Patent
Haddadin et al.

(10) Patent No.: US 8,953,715 B1
(45) Date of Patent: Feb. 10, 2015

(54) MULTI-BAND DIRECT SAMPLING RECEIVER

(75) Inventors: Osama S. Haddadin, Salt Lake City, UT (US); Joseph D. Spencer, Murray, UT (US); Rebekah Reeder, Portland, OR (US); Robert G. Rebolledo, Park City, UT (US)

(73) Assignee: L-3 Communications Corp., New York, NY (US)

( * ) Notice: Subject to any disclaimer, the term of this patent is extended or adjusted under 35 U.S.C. 154(b) by 588 days.

(21) Appl. No.: 13/153,068

(22) Filed: Jun. 3, 2011

(51) Int. Cl.
*H04L 27/00* (2006.01)

(52) U.S. Cl.
USPC .......................................................... 375/316

(58) Field of Classification Search
CPC ...................... H04L 25/03038; H04L 27/2647; H04N 5/4401; H04B 1/1027
USPC ................... 375/316, 346, 350, 260, 344–345
See application file for complete search history.

(56) References Cited

U.S. PATENT DOCUMENTS

| | | | |
|---|---|---|---|
| 5,758,296 A * | 5/1998 | Nakamura ..................... 375/284 |
| 7,436,910 B2 | 10/2008 | Fudge et al. |
| 7,436,911 B2 | 10/2008 | Fudge et al. |
| 7,489,745 B2 | 2/2009 | Fudge |
| 2005/0047494 A1 * | 3/2005 | Sasson et al. ................. 375/219 |
| 2007/0081578 A1 * | 4/2007 | Fudge et al. .................. 375/130 |
| 2007/0081617 A1 * | 4/2007 | Fudge ........................... 375/350 |
| 2008/0013653 A1 * | 1/2008 | Fudge et al. .................. 375/345 |
| 2011/0110313 A1 * | 5/2011 | Eu et al. ........................ 370/329 |

OTHER PUBLICATIONS

U.S. Appl. No. 13/153,038, filed Jun. 3, 2011, Haddadin et al.
Vaughan, Rodney G., "The Theory of Bandpass Sampling," article, IEEE Transactions on Signal Processing, vol. 39, No. 9, Sep. 1991.
Frerking, Marvin E., "Digital Signal Processing in Communications Systems," book, 1994, Van Nostrand Reinhold, New York.
"Sampling (signal processing)," Wikipedia encyclopedia definition, Jul. 27, 2010, www.en.wikipedia.org/wiki/Sampling_(signal_processing).
Groden, Michael, et al., "Wideband Receiver with Wideband Track and Hold," International Microwave Symposium, Jun. 7-12, 2009.

* cited by examiner

*Primary Examiner* — Vineeta Panwalkar
*Assistant Examiner* — Janice Tieu
(74) *Attorney, Agent, or Firm* — Kirton | McConkie

(57) ABSTRACT

A radio signal reception technique includes selecting a sample rate from a plurality of predefined sample rates so that the radio signal is contained entirely within a Nyquist zone corresponding to the sample rate. The radio signal is passed through a selected one of a plurality of selectable bandpass filters to provide an analog signal. The analog signal is sampled at the sample rate and converted to a digital signal.

20 Claims, 3 Drawing Sheets

MULTI-BAND DIRECT SAMPLING RECEIVER

The present application is related to the application entitled "MULTI-BAND DIRECT SAMPLING TRANSMITTER" Ser. No. 13/153,038 filed the same day as the present application and herein incorporated by reference to the extent its teachings do not conflict with the present application.

FIELD

The present application relates to wireless communications. More particularly, the present application relates to wireless communications using direct sampling.

BACKGROUND

Wireless communications is becoming increasingly important, with wireless systems finding their way into every growing numbers of applications. Wireless systems have become ubiquitous in the military environment.

Wireless communications can involve transmitting and receiving a radio frequency signal (e.g., a propagating radio wave). As spectrum has become scarcer, systems have been moving to higher and higher frequency communications bands. Many communications systems operate at carrier frequencies of several giga-Hertz (GHz) and above.

Transmission and reception of radio frequency signals has traditionally required a large number of analog components. Moreover, the components typically used in the radio frequency electronics of a transmitter and receiver have not enjoyed the same rapid advances in miniaturization and cost reduction as have digital components. Hence, the radio frequency electronics portion of transmitters and receivers often consume a large portion of allowable size, weight, and power budgets for equipment designs.

One trend in wireless communications is the use of so-called software-defined radios. In general, a software-defined radio uses digital processing to perform functions traditionally performed in analog components. Unfortunately, since propagating radio waves and other types of wireless signals are in an analog form, it is still necessary to convert between the analog domain and the digital domain. Moreover, components available for performing such conversions have limited operating speeds. Accordingly, there are a number of challenges in attempting to implement software define radios, particularly at frequencies of 2 GHz and above.

SUMMARY

In some embodiments of the invention, a method of receiving a radio signal is provided. The radio signal can be in any one of a plurality of different frequency bands. The method can include passing the radio signal through a selected one of a plurality of selectable bandpass filters to form a filtered signal. The selected one of the bandpass filters can have a passband encompassing the radio signal. Additional operations in the method can include sampling the filtered signal at the sample rate to form a sampled signal and digitizing the sampled signal to form a digitized signal. The sample rate can be selected from a plurality of predefined sample rates so that the passband is contained entirely within a Nyquist zone corresponding to the sample rate.

In some embodiments of the invention, a system for receiving a radio signal is provided. The radio signal can be in any one of a plurality of different frequency bands. The system can include a means for passing the spectrally-enhanced signal through a selected one of a plurality of selectable bandpass filters to form a filtered signal. The selected one of the bandpass filters can have a passband encompassing the radio signal. The system can also include a means for sampling the filtered signal at the sample rate to form a sampled signal and a means for digitizing the sampled signal to form a digitized signal. A means for selecting a sample rate from a plurality of predefined sample rates can be included. The sample rate can be selected so that the passband is contained entirely within a Nyquist zone corresponding to the sample rate.

In some embodiments of the invention, a system for receiving a radio signal is provided. The radio signal can be in any one of a plurality of different frequency bands. The system can include a plurality of bandpass filters. Each bandpass filter can have a passband and a center frequency. The passbands and center frequencies can correspond to a predefined set of communications bands. A switching network can be coupled to the plurality of bandpass filters. The switching network can be arranged so that a signal present at an input to the network is passed through a selectable one of the plurality of bandpass filters to produce a filtered signal at an output of the network. The system can also include a sample and hold and an analog to digital converter. The sample and hold can accept the filtered signal and provide a sampled output. The sampled output can be provided to the analog to digital converter which can provide a digital output. A programmable sample clock generator can output a sample clock to the sample and hold. The programmable sample clock generator can generate a selected one of a plurality of different sample clock rates.

BRIEF DESCRIPTION OF THE DRAWINGS

Additional features and advantages of the invention will be apparent from the detailed description that follows, taken in conjunction with the accompanying drawings, that together illustrate, by way of example, features of the invention; and, wherein.

DETAILED DESCRIPTION

Figure 1:
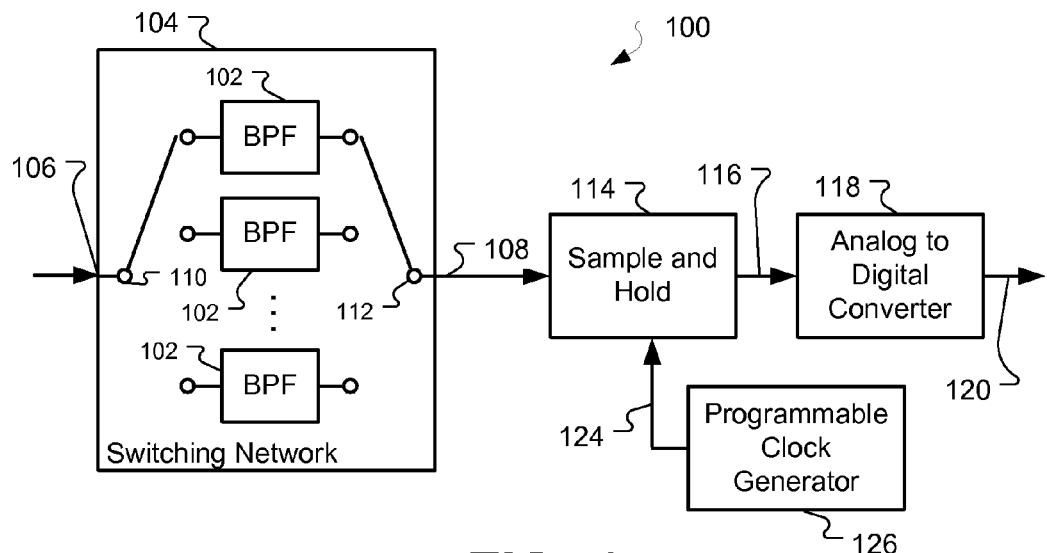
FIG. 1 is a block diagram of a receive system in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to an item includes reference to one or more of said item.

The term "ones" refers to one, two, or more, and generally applies to the selection of some or all of a quantity. The term "plurality" refers to two or more of an item.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

As used herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also to include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

As used herein, the term "alternatively" refers to selection of one of two or more alternatives, and is not intended to limit the selection to only those listed alternatives or to only one of the listed alternatives at a time, unless the context clearly indicates otherwise.

Turning to FIG. 1, receive system is illustrated in accordance with some embodiments of the present invention. The system, shown generally at 100, can include a plurality of bandpass filters 102. The bandpass filters can be operatively coupled to a switching network 104 to allow passing a signal present at the network input 106 through a selected one of the bandpass filters to produce a filtered signal at the network output 108. For example, the switching network can include an input switch 110 that selectively connects the network input to a selected one of the bandpass filters and an output switch 112 that selectively connects the network output to a selected one of the bandpass filters. Although the input switch and output switch are shown as single pole multiple throw switches, it will be appreciated that various types of switching arrangements can be used for routing signals through the selected one of the bandpass filters. As another example, the switching network can include a distribution amplifier (not shown) which provides an amplified version of the network input to each of the bandpass filters and an output switch selects the output of the selected one of the bandpass filters. Various other arrangements can also be used.

The system 100 can also include a sample and hold 114. The sample and hold can sample the output 108 from the filter and can provide a sampled signal 116 to an analog to digital converter 118. The analog to digital converter can convert the sampled signal into a digital signal 120. The sample and hold can operate at a sample rate driven by a sample clock 124 provide by a programmable sample clock generator 126. In some embodiments, the analog to digital converter can operate at the sample rate. In some embodiments, in the analog to digital converter can operate at a rate different from the sample rate (e.g., performing batch conversion of a series of stored samples of the sampled signal held in an analog storage).

Operation of the system 100 in some embodiments will now be described. The input signal to the network input 106 can be a radio signal in a communications band. The communications band can be, for example, any one of a plurality of frequency bands. For example, the frequency bands can be C-band, X-band, Ku-band, etc. As a specific example, one band can extend between about 3.7 GHz and about 4.2 GHz, one band can extend between about 7.25 GHz and about 7.75 GHz, and one band can extend between about 11.7 GHz and about 12.2 GHz. The frequency bands need not be contiguous to each other. The radio signal can be a modulated signal (e.g., encoding data into frequency, phase, amplitude, pulse position, etc.) which encodes information (e.g., digital data) into the signal. For example, the radio signal can be received by an antenna (not shown).

A suitable one of the bandpass filters 102 can be selected using the switching network 104 to selectively pass the desired frequency band which can be be within a single Nyquist zone of the sample and hold 114. Because of the sampling of the sample and hold, the sample and hold can produce aliases of input signals. The different aliases correspond to different Nyquist zones defined by the sample rate. For example, input frequencies between 0 and $f_s/2$ will map to frequencies between 0 and $\pi$ in the sampled domain. Input frequencies between f/2 and $f_s$ will also map between 0 and $\pi$ in the sampled domain. Hence, the range 0 and $f_s/2$ is sometimes referred to as the first Nyquist zone, the range between $f_s/2$ and $f_s$ is referred to as the second Nyquist zone, and so forth. Signals in Nyquist zones other than the desired zone are sometimes referred to as aliases or aliased signals when they appear in the output of the sample and hold. Hence, the sample and hold can perform a downconversion function, moving (aliasing) a high frequency signal into a lower frequency range. Depending on the characteristics of the sample and hold, some roll off higher frequencies may occur, since a practical sample and hold does not have infinitely wide input bandwidth. The bandpass filter can help to eliminate undesired signals (e.g., noise or signals in other frequency bands than the desired frequency band) which would otherwise alias into the sampled output.

In a conventional system, the first Nyquist zone is typically used, and a low pass filter is used to avoid the aliases. In contrast, in some embodiments of the present invention, Nyquist zones other than the first Nyquist zone can be used. For example, when using a sample rate of 4 GHz, an alias response is provided every 2 GHz. Thus, a signal in the frequency range of 10-12 GHz can be obtained by using the $6^{th}$ Nyquist zone. Accordingly, the switching network 104 can be used to select a desired one of the bandpass filters 102 which corresponds to the desired frequency band and Nyquist zone.

The sampled signal 116 can be provided to the analog to digital converter 118, which can convert the sampled signal into a digital signal 120. The digital signal can be provided to a processing system (not shown), for example to perform demodulation and other functions.

The sample rate of the sample clock 124 can be selected to ensure that the desired Nyquist zone properly lines up with a desired frequency band. For example, signals that span across the multiples of half the sample rates will alias with themselves distorting the spectrum. Accordingly, the sample rate can be selected so that the radio signal is contained entirely within a Nyquist zone corresponding to the sample rate. Table 1 below provides non limiting examples of frequency bands, sample rates, and Nyquist zones which can be used in some embodiments.

TABLE 1

Example Frequency Bands, Associated Bandwidths, and Sampling Clocks

| Frequency Band (GHz) | Center Freq (GHz) | Bandwidth (GHz) | Sample Clock (GHz) | Nyquist Zone |
|---|---|---|---|---|
| 1.71-1.85 | 1.78 | 0.14 | 0.34 | 11 |
| 3.31-3.71 | 3.51 | 0.40 | 2.81 | 3 |
| 7.25-7.75 | 7.5 | 0.50 | 3.34 | 5 |
| 7.90-8.40 | 8.15 | 0.50 | 3.63 | 5 |
| 7.20-8.80 | 8.00 | 1.60 | 3.56 | 5 |
| 14.40-14.83 | 14.62 | 0.43 | 3.90 | 8 |
| 15.05-15.35 | 15.2 | 0.30 | 3.58 | 9 |

Accordingly, based on the desired frequency band to be accepted at the network input 106, a suitable sample rate can be selected for the programmable sample clock generator 126 so that the desired frequency band aligns falls within a selected Nyquist zone. A suitable one of the bandpass filters 102 can be selected using the switching network 104 to selectively pass the desired frequency band within the selected Nyquist zone while rejecting aliases corresponding to other Nyquist zones. The system can operationally switch to a different frequency band during operation if desired.

The switching network and programmable sample clock generator can be controlled by a controller (not shown), which can, for example, include processing resources to perform necessary calculations and output control signals to the programmable clock generator and switching network based on inputs defining the desired frequency and bandwidth of operation. The controller can determine the sample rate based on the desired center frequency and bandwidth of the signal to be output, for example as shown in Table 1. For example, the controller can be a processor, digital memory look up table, or the like.

In some embodiments, the receive system 100 can also include additional components (not shown), such as low noise amplifiers, downconverters, diplexers, duplexers, antennas, frequency references, and the like.

Figure 2:
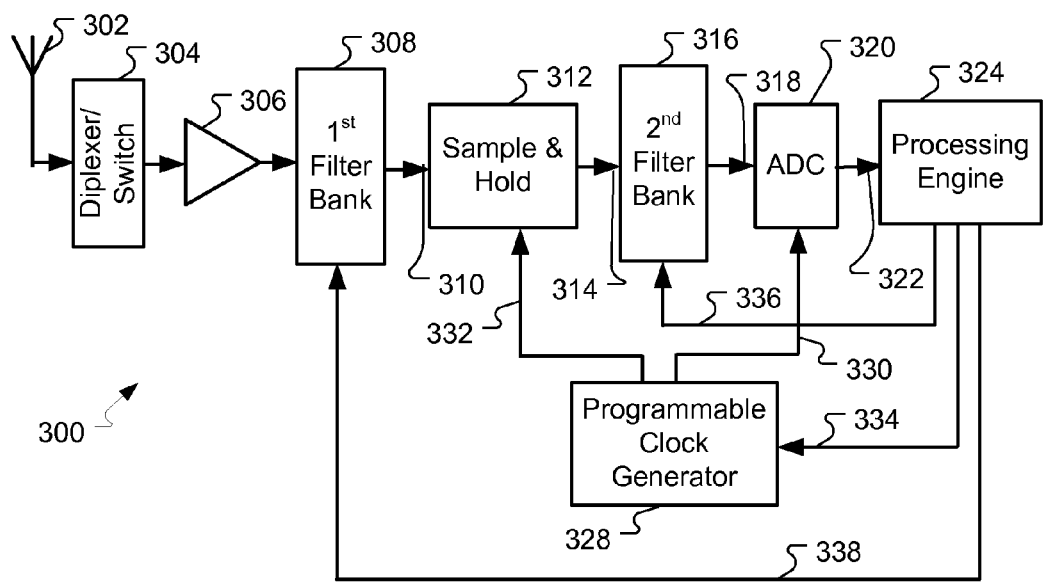
FIG. 2 is a block diagram of another receive system in accordance with some embodiments of the present invention.

FIG. 2 illustrates another embodiment of a receive system 300 which provides similar features as described above for FIG. 1 while augmenting the capability of the system. A propagating radio signal can be received by an antenna 302 and passed through a diplexer/switch 304, low noise amplifier 306, and a first filter bank 308 to provide a radio frequency signal 310 to a sample and hold 312. The diplexer/switch can be used to combine the receive system with a transmit system (e.g., like any of the transmit systems disclosed in the cross-referenced application). The first filter bank can be, for example, like the bandpass filters 102 and switching network 104 of FIG. 1 and can operate in a similar manner. The first filter bank can provide for radio frequency (RF) bandpass filtering. For example, the first filter bank can be used to pass a selected one of a plurality of Nyquist zones corresponding to the sample rate of the sample and hold. In some embodiments, the sample and hold can be like the sample and hold 114 of FIG. 1. As described above, the sample and hold can provide downconversion through aliasing as described above. In some embodiments, the first filter bank can be replaced by a filter having a fixed, pre-determined filter passband.

The output 314 of the sample and hold can be provided to a second filter bank 316. The second filter bank can be, for example, like the bandpass filters 102 and switching network 104 of FIG. 1 and can operate in a similar manner. The second filter bank can provide for intermediate frequency (IF) bandpass filtering. The second filter bank can interpolate the sampled signal 314 to form an interpolated signal 318 at the output. In some embodiments, the second filter bank can be replaced with a filter having a fixed, pre-determined filter passband (e.g., a low pass filter). The interpolated signal can be provided to an analog to digital converter 320. In some embodiments, the analog to digital converter can be like the analog to digital converter 118 of FIG. 1. The analog to digital converter can operate at sample rate (e.g., a resampling rate) the same as or different from the sample rate of the sample and hold 312. When the resampling rate (or the analog to digital converter) and the sampling rate (of the sample and hold) are different, a first set of aliases can be produced by the analog to digital converter (corresponding to the resampling rate) and a second set of aliases (different from the first set) can be produced by the sample and hold 314 (corresponding to the sampling rate). The analog to digital converter can output a digital signal 322.

A programmable clock generator 328 can provide the sample clocks 330, 332 to the digital to analog converter and the signal enhancer. For example, the programmable sample clock generator can provide clock rates selected from a plurality of different clock rates. In some embodiments, the programmable sample clock generator can be implemented using a programmable divider driven from a reference oscillator (or other clock source). The system can also include components (not shown) such as filters, amplifiers, frequency references, and the like.

The system can include a processing engine 324. The processing engine can include processing resources to implement a digital demodulator. The processing engine can also include processing resources to implement error correction decoding, symbol de-mapping, matched filtering, frequency tuning, Nyquist zone roll off compensation, and the like. In some embodiments, the processing engine can be implemented using a field programmable gate array (FPGA). In some embodiments, the processing engine be implemented using a digital signal processor (DSP).

Because the analog to analog converter 330 and sample and hold 312 can operate at different sample rates, greater flexibility in frequency band selection can be obtained as compared to FIG. 1. Thus, the processing engine 324 can determine the frequencies of the sample clocks 330, 332 and provide control information 334 to the programmable sample clock generator 328 to set the desired frequencies. For example, the analog to digital converter 320 can use a resampling clock 330 at a first rate (resampling rate) and the sample and hold can use a sampling clock 332 at a second rate (sampling rate) different from the first rate. The processing engine can also provide control information 336, 338 to set the filter banks to desired passbands.

The system 300 can provide several degrees of freedom in selecting resampling rate, sampling rate, and filters as a function of the desired frequency and bandwidth of the radio signal. In some embodiments, the resampling rate can be selected to be at least twice the desired bandwidth of the radio signal and the sampling rate can be selected to provide a desired center frequency of the radio signal.

The system 300 can provide for flexibility in accommodating transmission of signals in a number of different communications bands. For example, the system can be configured into a first configuration to receive a signal in a first communications band (e.g., any of L, S, C, X, Ku, Ka bands). In the first configuration, the resampling rate can be set to a first resampling rate and the sampling rate can be set to a first sampling rate. The filter banks can be set to pass first desired ones of the Nyquist bands. The processing engine 324 can calculate the resampling rate, sampling rate, and filter bank settings based on the frequency/bandwidth of the received signal. Alternatively, the processing engine can include a table which specifies the resampling rate, sampling rate, and filter bank settings for a number of different communications bands.

The system 300 can operationally switch to receive a signal in a second frequency band. For example, to operate in the second frequency band, a second configuration which comprises a second resampling rate, a second sampling rate, and second filter bank settings based on the frequency and bandwidth of the received radio signal.

The system 300 can avoid the need for a downconverter, providing entirely digital tuning. If desired, the capability of the system can be extended by can including a downconverter (not shown) within the receive chain. For example, the downconverter can be between the low noise amplifier 306 and $1^{st}$ filter bank 308, or between the $1^{st}$ filter bank and the sample and hold 312. The downconverter can provide for shifting of the frequency of the received signal. The amount of downcoversion can be variable and can be programmed along with sample rate, resampling rate, and other operational parameters. When a downconverter is included, the frequencies of the bandpass filters can thus correspond to desired communications bands plus or minus a frequency shift corresponding to the amount of downconversion.

Figure 3:
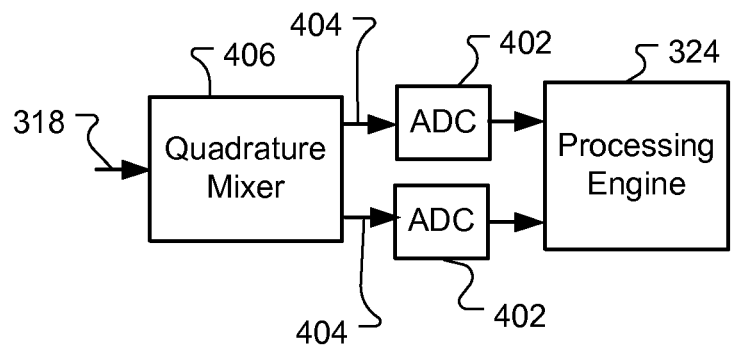
FIG. 3 is a block diagram of a quadrature arrangement of analog to digital converters which can be used in the systems of FIG. 1 and FIG. 3.

FIG. 3 illustrates an alternate arrangement of a portion of a receive system which can be used with complex (inphase/quadrature) digital signals. For example, the system 300 of FIG. 2 can be modified so that processing engine 324 accepts two digital inputs (e.g., inphase and quadrature) which are provided by two analog to analog converters 402. An interpolated signal 318 can be split into quadrature signals 404 by a quadrature mixer 406.

In some embodiments, the quadrature mixer 406 can be moved to the left of the $2^{nd}$ filter bank 316, the sample and hold 312, or the $1^{st}$ filter bank 308. In such a case, second ones of the $1^{st}$ filter bank, signal enhancer, and $2^{nd}$ filter bank can be included, providing a quadrature path through these components.

Figure 4:
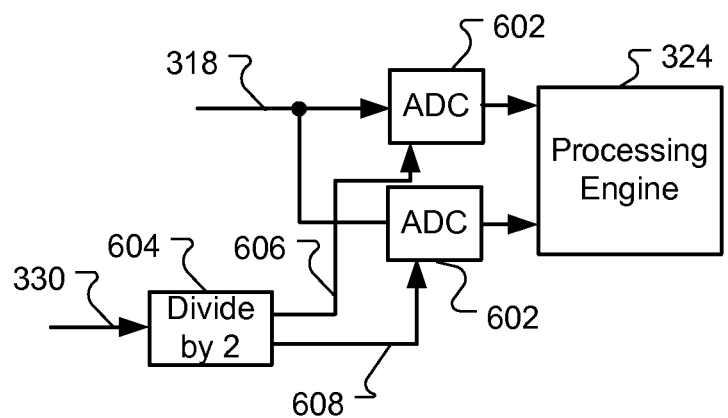
FIG. 4 is a block diagram of another arrangement of analog to digital converters which can be used in the systems of FIG. 1 and FIG. 3.

FIG. 4 illustrates yet another alternate arrangement of a portion of a receive system which can be used with dual converters. For example, the system 300 of FIG. 2 can be modified so that the processing engine 324 accepts digital inputs in parallel provided by separate analog to digital converters 602. The digital to analog converts can operate on the interpolated signal 318, but can take alternate time samples (e.g., even and odd). For example, in some embodiments, the resampling clock 330 can be divided by two by a divider 604, and different phases 606, 608 of the divided clock provided to the analog to digital converters. Alternatively, the programmable clock generator 328 can generate the two half-rate out of phase sample clocks directly. The analog to digital converters 602 can operate at half the resampling rate as compared to the single analog to digital converter 320 of FIG. 3. Hence operation for bandwidths or frequencies twice as high as the unmodified version of FIG. 3 can be accommodated. In some embodiments, two sample and holds 318 (and thus two filter banks 316) can be provided, in which case the sample and holds can also operate at half the sample rate.

Figure 5:
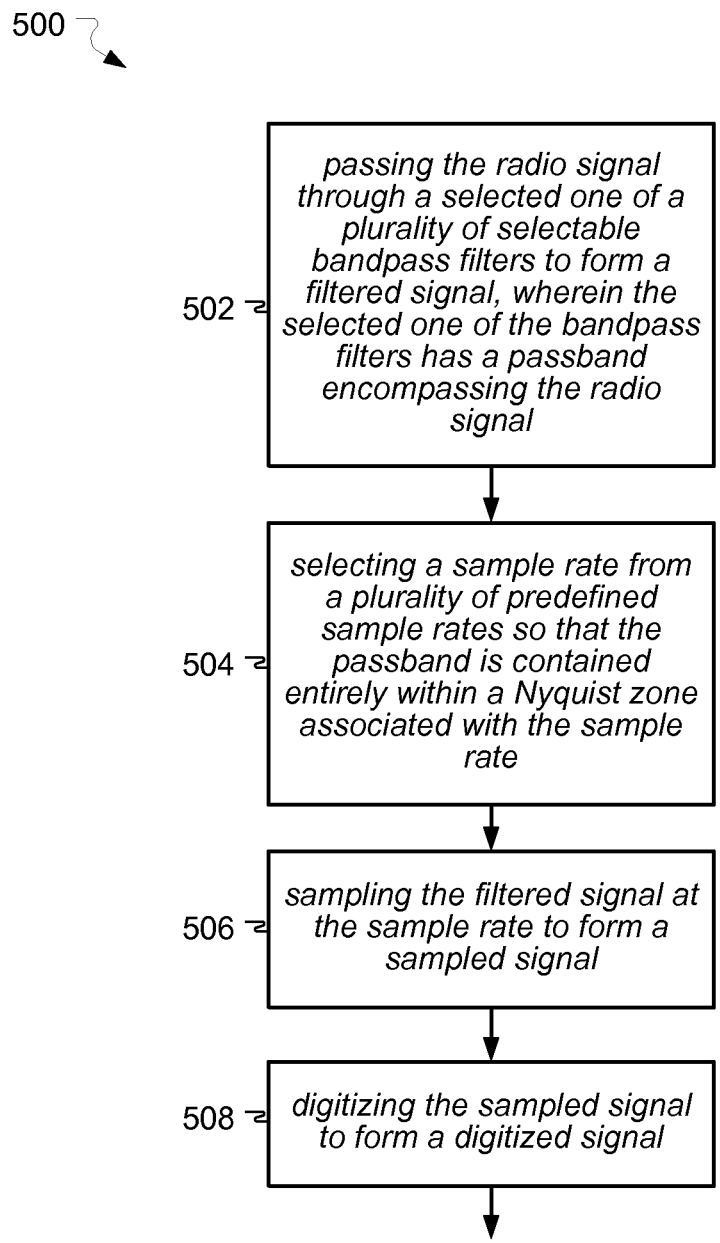
FIG. 5 is flow chart of a method for transmitting a radio signal in accordance with some embodiments of the present invention.

FIG. 5 illustrates a flow chart of a method of receive a radio signal. The method, shown generally at 500, can for example be performed by the systems 100, 200, 300 of FIGS. 1-3. Alternatively, other systems can be used to perform the method.

The method 500 can include passing 502 the radio signal through a selected one of a plurality of selectable bandpass filters to form a filtered signal. The selected one of the bandpass filters can have a passband encompassing the radio signal. In particular, the passband can encompass desired portions of the radio signal. For example, the stopband of the bandpass filter can remove signals outside the desired band (e.g., noise and other undesired signals). For example, as described above, a filter bank can be provided which can have a plurality of bandpass filters, and one of the bandpass filters can be selected. As another example, one or more filter components can be selectively connected or interconnected to provide a bandpass filter with the desired bandwidth and center frequency.

The method can also include selecting 504 a sample rate from a plurality of predefined sample rates so that the radio signal to be received can be contained entirely within a Nyquist zone corresponding to the sample rate. For example, as described above, a predefined sample rate can be defined for different communications bands in which the radio signal can reside. There can be a plurality of different communications bands, any one of which can be selected. As another example, as described above, the sample rate can be computed from the bandwidth and frequency of the radio signal. The sample rate can be determined by a controller (e.g., as described above) and used to program a programmable sample clock generator (e.g., as described above).

The method 500 can also include sampling 506 the filtered signal at the sample rate to produce a sampled signal. The sampling can be performed by any suitable means for sampling an analog signal. For example, as described above, the sampling can be performed by a sample and hold or similar device.

Another operation in the method 500 can be digitizing 508 the sampled signal to form a digital signal. The digitizing can be performed by any suitable means for converting an analog signal to a digitized signal. For example, the digitizing can be performed by one or more digital to analog converters, for example, as described above. The digitized signal can be a modulated signal (e.g., as described above).

Various examples of receive systems have been illustrated. It will be appreciated that the receive systems of FIG. 1 can also include features illustrated in the receive system of FIG. 2 and vice versa. Moreover, while several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims. While several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

What is claimed is:

1. A method of receiving a radio signal wherein the radio signal is in any one of a plurality of different frequency bands, the method comprising:
    passing a received signal through a selected one of a first set of bandpass filters to form a filtered signal in analog form, wherein the selected one of the first set of bandpass filters has a passband encompassing the received signal;
    sampling the filtered signal in analog form at a first sample clock rate to form a sampled analog signal;
    passing the sampled analog signal through a selected one of a second set of bandpass filters to form an interpolated signal;
    digitizing the interpolated signal at a second sample clock rate to form a digitized signal; and
    selecting the one of the first set of bandpass filters to pass a first frequency band corresponding to an nth Nyquist zone, wherein:
        the first sample clock rate corresponds to the nth Nyquist zone, n is an integer, and
        the sampling and the passing the sampled analog signal through the selected one of the second set of bandpass filters downconvert the interpolated signal to a second frequency band that is less than the first frequency band.

2. The method of claim 1, wherein the plurality of different frequency bands are not contiguous.

3. The method of claim 2, wherein the plurality of different frequency bands comprises:
    a band extending between about 3.7 GHz and about 4.2 GHz; and
    a band extending between about 7.25 GHz and about 7.75 GHz.

4. The method of claim 3, wherein the plurality of different frequency bands further comprises a band extending between about 11.7 GHz and about 12.2 GHz.

5. The method of claim 1, wherein the digitizing the sampled analog signal comprises:
    converting a first sample of the sampled analog signal using a first analog to digital converter; and
    converting a second sample of the sampled analog signal using a second analog to digital converter, wherein the second analog to digital converter operates in parallel with the first analog to digital converter.

6. The method of claim 5, wherein:
    the converting the first sample is performed at a fraction of the selected second sample clock rate, and
    the converting the second sample is performed at a fraction of the selected second sample clock rate.

7. The method of claim 1, further comprising switching to receive a second radio signal, wherein the switching comprises:
    selecting a first different filter from the first set of bandpass filters and a second different filter from the second set of bandpass filters; and
    passing the second radio signal through the first different filter to form a second filtered signal;
    selecting a third sample clock rate so that the passband of the first different filter is contained entirely within a Nyquist zone associated with the third sample clock rate;
    sampling the second filtered signal at the third sample clock rate using the sample and hold to form a second sampled signal;
    passing the second sampled signal through the second different filter to form a second interpolated signal; and
    digitizing the second interpolated signal to form a second digitized signal.

8. The method of claim 1 further comprising, selecting the first sample clock rate so that the passband of the selected one of the first set of bandpass filters is contained entirely within the nth Nyquist zone.

9. The method of claim 1, wherein:
    the nth Nyquist zone corresponds to sampling frequencies $f_s$ of the received signal in a band between $(n-1)*f_s/2$ and $n*f_s/2$ inclusive,
    / is mathematical division, and
    is mathematical multiplication.

10. The method of claim 1, wherein the converting the interpolated signal into digital samples comprises converting the interpolated signal into digital samples utilizing a plurality of parallel analog to digital converters.

11. The method of claim 1, wherein the first sample clock rate is the same as the second sample clock rate.

12. The method of claim 1, wherein the first sample clock rate is different than the second sample clock rate.

13. The method of claim 1 further comprising:
    selecting the first sample clock rate to be at least two times the frequency band of the received signal, and
    selecting the second sample clock rate to provide a desired center frequency for the received signal.

14. A system for receiving a radio signal, wherein the radio signal is in any one of a plurality of different frequency bands, the system comprising:
    a plurality of bandpass filters, each bandpass filter having a passband and a center frequency, wherein the passbands and center frequencies correspond to a predefined set of communications bands;
    a switching network coupled to the plurality of bandpass filters, having a network input and a network output, wherein the switching network is arranged so that a signal present at the network input is passed through a selectable one of the plurality of bandpass filters to produce a filtered signal corresponding to an nth Nyquist zone at the network output where n is an integer;
    a sample and hold having a sampler input and a sampler output, wherein the sampler input is coupled to the network output;
    an analog to digital converter having a digitized output and an analog input, wherein the analog input is coupled to the sampler output;
    a programmable sample clock generator having a sample clock output coupled to the sample and hold, wherein the programmable sample clock generator generates a selected one of a plurality of different sample clock rates corresponding to the nth Nyquist zone; and
    an interpolation filter disposed between the sampler output and the analog input, wherein the programmable sample clock generator has a resampling clock output coupled to the analog to digital converter, and the resampling clock has a different frequency than the sample clock,
    wherein the interpolation filter comprises a plurality of selectable bandpass filters, and the sample and hold and interpolation filter downconvert the filtered signal at the sampler input from a first frequency band to a second frequency band that is less than the first frequency band.

15. The system of claim 14, wherein the switching network comprises a switch connected between the network input and respective inputs of each of the plurality of bandpass filters.

16. The system of claim 14, wherein the switching network comprises a switch connected between the network output and respective outputs of each of the plurality of bandpass filters.

17. The system of claim 14, wherein the analog to digital converter is coupled to the programmable sample clock generator.

18. The system of claim 14, wherein:
the sampler input of the sample and hold is an analog input, and
the sampler output of the sample and hold is an analog output.

19. A system for receiving a radio signal, wherein the radio signal is in any one of a plurality of different frequency bands, the system comprising:
means for filtering the received radio signal with a selected one of a plurality of bandpass filters, each band pass filter having a passband and a center frequency, wherein the passband and center frequencies correspond to a predefined set of communications bands;
means for passing the radio signal through the selected bandpass filter to form a filtered signal;
means for selecting the selected one of the bandpass filters to pass a first frequency band corresponding to an nth Nyquist zone and a sample clock rate from a plurality of predefined sample clock rates that corresponds to the nth Nyquist zone, where n is an integer;
means for sampling the filtered signal at the selected sample clock rate to form a sampled signal;
means for filtering the sampled signal with a selected one of a second plurality of bandpass filters to form an interpolated signal, wherein the sampling of the filtered signal by the means for sampling and the filtering of the sampled signal by the means for filtering the sampled signal downconvert the interpolated signal from a passband of the selected bandpass filter to another frequency band that is less than the passband of the selected bandpass filter; and
means for digitizing the interpolated signal to form a digitized signal.

20. The system of claim 19, wherein the means for digitizing the interpolated signal comprises:
a first analog to digital converter configured to digitize a first interpolated sample of the interpolated signal, and
a second analog to digital converter configured to digitize a second interpolated sample of the interpolated signal,
wherein the second analog to digital converter is disposed in parallel to the first analog to digital converter.

* * * * *